United States Patent
Griffin et al.

(10) Patent No.: US 11,240,270 B1
(45) Date of Patent: Feb. 1, 2022

(54) SECURE ELECTRONIC TRANSACTIONS USING TRANSPORT LAYER SECURITY (SETUTLS)

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 372 days.

(21) Appl. No.: 16/539,726

(22) Filed: Aug. 13, 2019

(51) Int. Cl.
*H04L 29/06* (2006.01)
*H04L 9/08* (2006.01)

(52) U.S. Cl.
CPC .......... *H04L 63/166* (2013.01); *H04L 9/0819* (2013.01); *H04L 9/0861* (2013.01); *H04L 9/0894* (2013.01); *H04L 63/08* (2013.01); *H04L 63/10* (2013.01)

(58) Field of Classification Search
CPC ....... H04L 63/08; H04L 63/10; H04L 63/166; H04L 9/0819; H04L 9/0861; H04L 9/0894
USPC ........................................................ 713/150
See application file for complete search history.

(56) References Cited

PUBLICATIONS

Internet Engineering Task Force (IETF) Request for Comments: 8446 The Transport Layer Security (TLS) Protocol Version 1.3 E. Rescorla, Mozilla Aug. 2018 (Year: 2018).*
ETS Isn't TLS and You Shouldn't Use It By Jacob Hoffman-Andrews—Feb. 26, 2019 https://www.eff.org/deeplinks/2019/02/ets-isnt-tls-and-you-shouldnt-use-it (Year: 2019).*

* cited by examiner

*Primary Examiner* — Kambiz Zand
*Assistant Examiner* — Benjamin A Kaplan
(74) *Attorney, Agent, or Firm* — Foley & Lardner LLP

(57) ABSTRACT

A system and method for extending data protection of data elements of a data packet beyond a TLS tunnel termination point by using encryption keys established when the TLS tunnel was established. The system and method include authenticating a client device to establish a shared secret. The system and method include receiving a data packet comprising a data element and an object identifier associated with the data element, the data element encrypted with a first content-specific key associated with the shared secret, the data packet encrypted with a session key. The system and method include decrypting the data packet using the session key to recover a decrypted data packet. The system and method include determining an existence of an object identifier in the decrypted data packet. The system and method include decrypting the data element of the decrypted data packet using a second content-specific key associated with the object identifier.

25 Claims, 7 Drawing Sheets

600

```
authenticating, by one or more processors via a
communication channel, a client to establish a
shared secret
602
```

```
receiving, by the one or more processors from the
client via the communication channel, a data packet
comprising a data element and an object identifier
associated with the data element, the data element
encrypted with a first content-specific key
associated with the shared secret, the data packet
encrypted with a session key
604
```

```
decrypting, by the one or more processors, the data
packet using the session key to recover a decrypted
data packet
606
```

```
determining, by the one or more processors, an
existence of an object identifier in the decrypted
data packet
608
```

```
decrypting, by the one or more processors, the data
element of the decrypted data packet using a
second content-specific key associated with the
object identifier to recover a decrypted data element
610
```

FIG. 6

SECURE ELECTRONIC TRANSACTIONS USING TRANSPORT LAYER SECURITY (SETUTLS)

BACKGROUND

Secure Electronic Transaction (SET) allocated certificates to cardholders, merchants, and payment gateways such that purchase data was encrypted between the cardholder and the merchant, but payment information was encrypted between the cardholder and the gateway. The merchant received an authorization from the gateway to complete the purchase so goods and services could be provided to the cardholder. However, the SET implementation ultimately disregarded cardholder certificates and large merchants received the payment information along with the authorization from the gateway for clearing and settlement. Thus, SET was equivocally reduced to Secure Sockets Layer (SSL) technology between the cardholder and merchant, and between the merchant and payment gateway. SET was deployed in 1997 but decommissioned in 2002. While SSL was new, easier, simpler, and supported by the browser community, it was later deprecated and replaced by Transport Layer Security (TLS). SSL and TLS have had their own problems.

SUMMARY

Aspects of the present disclosure relate generally to secure electronic transactions using Transport Layer Security (TLS), and more particularly to systems and methods for extending data protection of one or more data elements within a data packet beyond a TLS tunnel termination point by using encryption keys established when the TLS tunnel was established.

One arrangement disclosed herein is directed to a method of extending data protection of one or more data elements within a data packet beyond a TLS tunnel termination point by using application-level encryption keys generated when the TLS tunnel was established. In some arrangements, the method includes authenticating, by one or more processors via a communication channel, a client device to establish a shared secret. In some arrangements, the method includes receiving, by the one or more processors from the client device via the communication channel, a data packet comprising a data element and an object identifier associated with the data element, the data element encrypted with a first content-specific key associated with the shared secret, the data packet encrypted with a session key. In some arrangements, the method includes decrypting, by the one or more processors, the data packet using the session key to recover a decrypted data packet. In some arrangements, the method includes determining, by the one or more processors, an existence of an object identifier in the decrypted data packet. In some arrangements, the method includes decrypting, by the one or more processors, the data element of the decrypted data packet using a second content-specific key associated with the object identifier to recover a decrypted data element.

In another aspect, the present disclosure is directed to a system for extending data protection of one or more data elements within a data packet beyond a TLS tunnel termination point by using application-level encryption keys generated when the TLS tunnel was established. In some arrangements, the system includes one or more processors; and one or more computer-readable storage mediums storing instructions which, when executed by the one or more processors, cause the one or more processors to authenticate, via a communication channel, a client device to establish a shared secret. In some arrangements, the one or more computer-readable storage mediums store instructions that cause the one or more processors to further receive, via the communication channel, a data packet comprising a data element and an object identifier associated with the data element, the data element encrypted with a first content-specific key associated with the shared secret, the data packet encrypted with a session key. In some arrangements, the one or more computer-readable storage mediums store instructions that cause the one or more processors to further decrypt the data packet using the session key to recover a decrypted data packet. In some arrangements, the one or more computer-readable storage mediums store instructions that cause the one or more processors to further determine an existence of an object identifier in the decrypted data packet. In some arrangements, the one or more computer-readable storage mediums store instructions that cause the one or more processors to further decrypt the data element of the decrypted data packet using a second content-specific key associated with the object identifier to recover a decrypted data element.

One arrangement disclosed herein is directed to a non-transitory computer-readable storage medium storing instructions which, when executed by one or more processors, cause the one or more processors to perform operations including authenticating, by one or more processors via a communication channel, a client device to establish a shared secret. In some arrangements, the non-transitory computer-readable storage medium storing instructions which, when executed by one or more processors, cause the one or more processors to perform operations further including receiving, by the one or more processors from the client device via the communication channel, a data packet comprising a data element and an object identifier associated with the data element, the data element encrypted with a first content-specific key associated with the shared secret, the data packet encrypted with a session key. In some arrangements, the non-transitory computer-readable storage medium storing instructions which, when executed by one or more processors, cause the one or more processors to perform operations further including decrypting, by the one or more processors, the data packet using the session key to recover a decrypted data packet. In some arrangements, the non-transitory computer-readable storage medium storing instructions which, when executed by one or more processors, cause the one or more processors to perform operations further including determining, by the one or more processors, an existence of an object identifier in the decrypted data packet. In some arrangements, the non-transitory computer-readable storage medium storing instructions which, when executed by one or more processors, cause the one or more processors to perform operations further including decrypting, by the one or more processors, the data element of the decrypted data packet using a second content-specific key associated with the object identifier to recover a decrypted data element.

These and other features, together with the organization and manner of operation thereof, will become apparent from the following detailed description when taken in conjunction with the accompanying drawings.

BRIEF DESCRIPTION OF THE FIGURES

FIG. 6 is a flow diagram depicting a method for extending data protection of one or more data elements within a data packet beyond a TLS tunnel termination point by using encryption keys established when the TLS tunnel was established, according to some arrangements.

Like reference numbers and designations in the various drawings indicate like elements.

DETAILED DESCRIPTION

Figure 1:
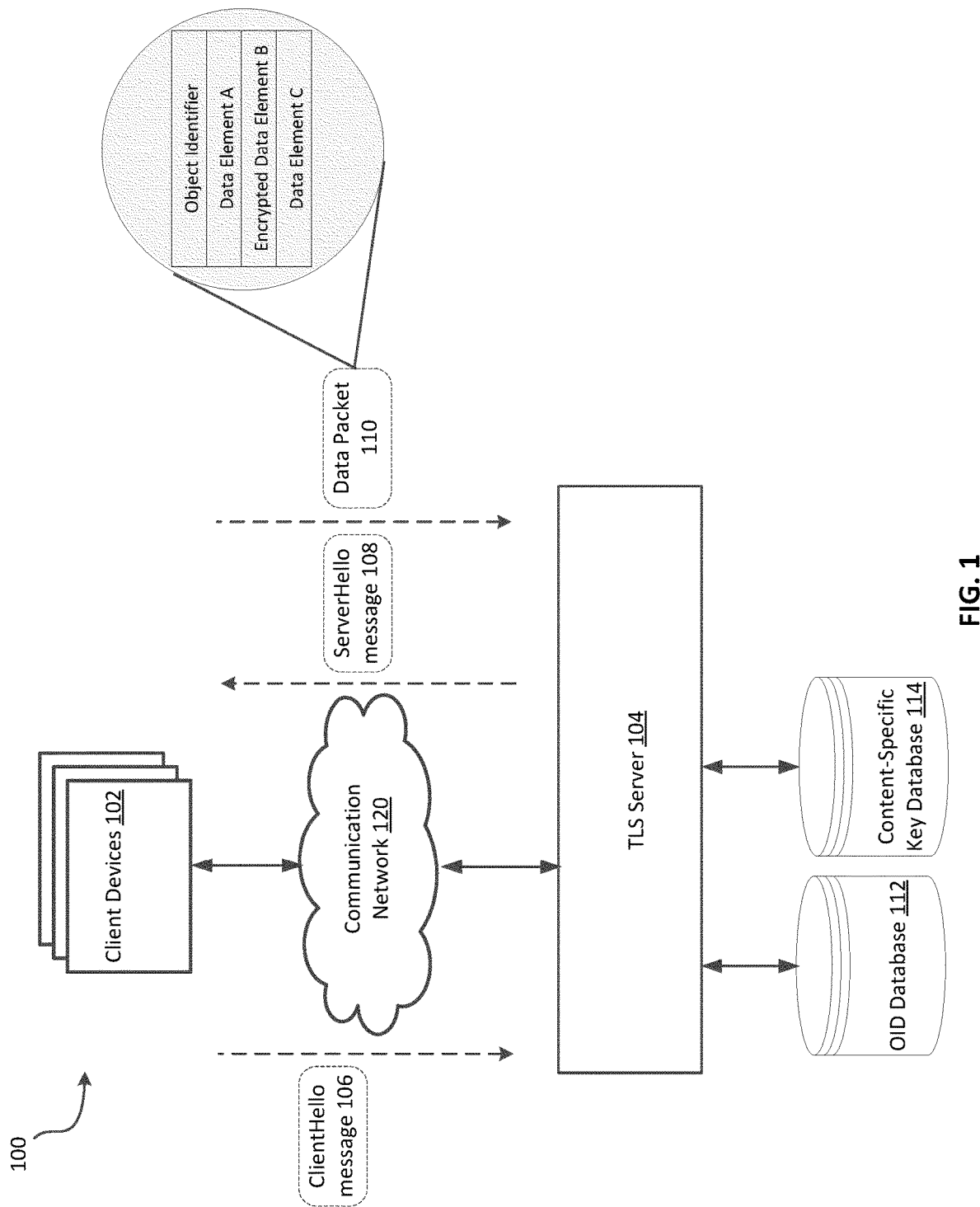
FIG. 1 is a block diagram depicting an example environment for extending data protection of one or more data elements within a data packet beyond a TLS tunnel termination point by using encryption keys established when the TLS tunnel was established, according to some arrangements.

The TLS protocol is designed to provide three essential services to all applications running above it: authentication, encryption and data integrity. To establish a cryptographically secure data channel between peers (e.g., client device to/from server, client device to/from another client device, server to/from another server), the peers negotiate with one another to agree on a set of keys (e.g., encryption keys) that will be used to encrypt the data. The TLS protocol defines a TLS handshake protocol that negotiates cryptographic parameters between the peers for the purpose of establishing TLS session keys. Specifically, the peers negotiate a shared secret (or shared secret key) without having to establish any prior knowledge of each other, and to do so over an unencrypted channel. For example, when a peer (e.g., a client device) attempts to establish a connection with another peer (e.g., a server), the peers generate and exchange public keys, such as a Diffie-Hellman Key (also referred to herein as, "TLS_DH") and an ephemeral Diffie-Hellman Key (also referred to herein as, "TLS_DHE") to establish the shared secret (i.e., common secret, master secret) between the peers. The peers then pass the shared secret through a key derivation function (KDF) that uses a pseudorandom function to generate (e.g., compute, derive, calculate) a data encryption (DE) key and a hash message authentication code (HMAC) key to facilitate confidentiality and integrity of the data.

After negotiating (e.g., computing, calculating, generating, etc.) the shared secret and generating the DE keys and the HMAC keys, the peers may communicate with one another by transmitting a data packet. To ensure data integrity, a peer transmits a data packet with an integrity check value (ICV) generated from the data packet using an HMAC key. Thus, the entire contents of the data packet are treated equally, even in instances when the data packet contains sensitive data elements (e.g., debit card pin, a password, a social security tax ID, biometrics, etc.) or components. That is, the TLS protocol simply encrypts the sensitive data elements and non-sensitive data elements of a data packet using the same DE key (or session key).

However, encrypting sensitive and non-sensitive data with the same encryption key may, depending on where the TLS tunnel terminates, expose the sensitive data to risky, unprotected environments. For example, an enterprise network may have an application running on a server in its demilitarized zone (DMZ). The client device (also referred to herein as, "a client") and the server could terminate the TLS tunnel outside the DMZ via a router, inside the DMZ via a load balancer, or inside the DMZ via a web server. Consequently, if the client device and the server exchange a data packet that includes sensitive data elements (e.g., debit card pin, tax identifier, a password, etc.), then those sensitive data elements could be exposed to the environment at the TLS tunnel termination point. Thus, there is a long-felt need in providing a mechanism for encrypting sensitive data elements of a data packet such that termination of a TLS tunnel does not expose the sensitive data elements to an unprotected environment.

Accordingly, the present disclosure is directed to systems and methods for extending data protection of one or more data elements (e.g., sensitive data, personal data, financial data, etc.) within a data packet beyond a TLS tunnel termination point by using cryptographic keys established when the TLS tunnel was established. Specifically, and discussed in greater detail below, this disclosure describes an extension to the TLS protocol for generating content-specific keys (also referred to herein as, "SET keys") by inserting an object identifier (OID) into a TLS protocol extension field of a data packet. In some arrangements, the system and methods described herein extend the TLS protocol (e.g., version 1.3, as defined in Request for Comments (RFC) 8446, and later versions) for generating content-specific keys. By providing application-level encryption without application-level key management, the systems and methods allow client/server applications to communicate in a way that may prevent eavesdropping, tampering, or message forgery.

In general, the TLS protocol allows a client device (e.g., client device 102 in FIG. 1) to initiate a call to a server (e.g., a TLS server 104 in FIG. 1), or another client device, by sending a request message (referred to herein as, "a ClientHello message") requesting to establish a secure connection with the server. In some arrangement, a server may initiate a call to another server by sending a request message, similar to a ClientHello message, to the other server. The ClientHello (e.g., ClientHello 106 message in FIG. 1) message may include one or more messaging parameters or fields (e.g., protocol version, random, opaque legacy session ID, cipher suites, opaque legacy compression methods, and extension). For example, a client device and a server may establish a common pin key. After the common pin is established, the client device may initiate a call by sending a ClientHello message that includes an encrypted pin to the server. In another example, the server may initiate a call by sending a ServerHello message to the client device. In response to receiving the ClientHello message, the server generates a message (referred to herein as, a "ServerHello message") that includes computer code or instructions (e.g., applet). The server sends the ServerHello message (e.g., ServerHello 108 message in FIG. 1) to the client device, which causes the client device to execute the computer code that produces a pop-up window requesting for the user to provide the encrypted pin. The ServerHello message may include one or more message fields (e.g., Protocol Version, Random, Opaque legacy session ID, Cipher Suites, Uint8 legacy compression methods, and Extension).

Once the peers (e.g., the client device and server) set up the TLS session keys, they may generate content-specific keys (e.g., pin encryption key, password encryption key, a biometrics encryption key, etc.) that could be used to encrypt one or more sensitive data elements of the data packet. Every sensitive data element that is encrypted with this extra layer of encryption, via the content-specific keys, may include the content of the sensitive data element and/or the object identifier indicating a data type (e.g., a pin, a tax id, etc.) associated with the sensitive data element. Since both parties know the common shared secret that was used to establish the TLS handshake, each party can generate (e.g., derive, establish, calculate) the content-specific keys without having to transmit the content-specific keys to one another across a communication network. Thus, the client device encrypts the sensitive data element (e.g., password, pin, tax identifier, etc.) of the data packet using a content-specific key associated with the sensitive data element to generate an encrypted sensitive data element. The client device then encrypts the entire data packet (also referred to as, "an application data packet" and/or data packet 110 in FIG. 1) using the TLS session keys, and transmits the encrypted data packet upstream to the server. The TLS tunnel (e.g., the server) then decrypts the data packet using the TLS session key at the TLS tunnel termination point and pushes (e.g., sends, delivers, passes) the content-specific keys and/or the decrypted data packet up to an application executing on the server.

In response to receiving the content-specific key and the decrypted data packet, the application decrypts the encrypted sensitive data element of the decrypted data packet. In some arrangements, the TLS tunnel decrypts the data packet using the TLS session key at the TLS tunnel termination point, decrypts the encrypted sensitive data element using the content-specific keys at the TLS tunnel termination point, and pushes the decrypted data packet and/or the decrypted sensitive data element to an application executing on the server. In some arrangements, an application executing on the server encrypts one or more sensitive data elements using the content-specific key to generate encrypted sensitive data elements, and passes the encrypted sensitive data elements to the TLS tunnel to be encapsulated into an encrypted data packet (using the TLS session keys) and transmitted to the client device.

FIG. 1 is a block diagram depicting an example environment 100 for extending data protection of sensitive data elements of a data packet beyond a TLS tunnel termination point by using encryption keys established when the TLS tunnel was established, according to some arrangements. The environment 100 includes a client device 102, a TLS server 104, and a communication network 120. The client device 102 and/or the TLS server 104 may each include hardware elements, such as one or more processors, logic devices, or circuits. The environment 100 includes an object identifier database (shown in FIG. 1 as, "OID database 112") for storing object identifiers. The environment 100 includes a content-specific key database 114 for storing content-specific key database. The OID database 112 and content-specific key database 114 may be communicably coupled to the TLS server 104 via the communication network 120 and/or any local network (not shown).

A client device 102 may be an electronic device that is under control of a user and may be capable of receiving and/or sending TLS messages (e.g. a ClientHello message, a ServerHello message, a data packet, application data, etc.) to/from one or more TLS servers 104 and/or one or more client devices 102 over communication network 120. The client device 102 may be any number of different types of user electronic devices adapted to communicate over a communication network 120, including without limitation, a personal computer, a laptop computer, a desktop computer, a mobile computer, a tablet computer, a smart phone, a digital video recorder, a set-top box for a television, a video game console, or any other type and form of computing device or combinations of devices. In some arrangements, the type of client device 102 may be categorized as a mobile device, a desktop device, a device intended to remain stationary, a device adapted to primarily access a network via a local area network (e.g., communication network 120), or another category of electronic devices such as a media consumption device. The client device 102 may include a user application (e.g., a web browser) to facilitate the sending and receiving of data over communication network 120.

The TLS server 104 may be an electronic device that is capable of receiving and/or sending TLS messages (e.g. a ClientHello message, a ServerHello message, a data packet, application data, etc.) to/from one or more TLS servers 104 and/or one or more client devices 102 over communication network 120. The client device 102 may be any number of different types of user electronic devices adapted to communicate over a communication network 120, including without limitation, an application server, a catalog server, a communications server, a computing server, a database server, a file server, a game server, a mail server, a media server, a proxy server, a virtual server, a web server, or any other type and form of computing device or combinations of devices.

The communication network 120, (e.g., a local area network (LAN), wide area network (WAN), the Internet, or a combination of these or other networks) connects any electronic device (e.g., client device 102, TLS server 104, etc.) with one or more electronic devices and/or databases (e.g., OID database 112, content-specific key database 114). The environment 100 may include many thousands of client devices 102 and TLS servers 104 interconnected in any arrangement to facilitate exchange of data between the electronic devices. Although not illustrated, in many arrangements, the communication network 120 may comprise one or more intermediary devices, including gateways, routers, firewalls, switches, network accelerators, Wi-Fi access points or hotspots, or other devices. Any of the electronic devices and/or the communication network 120 may be configured to support any application layer protocol, including without limitation, Transport Layer Security (TLS), Secure Socket Layer (SSL), Hypertext Transfer Protocol (HTTP), and Hypertext Transfer Protocol Secure (HTTPS).

Still referring to FIG. 1, the client device 102 and/or TLS server 104 may derive (e.g., generate, calculate, compute) content-specific keys for use with the TLS extension field. For example, the client device 102 and/or the TLS server 104 may pass a shared secret through a key derivation function (KDF) that uses a pseudorandom function to generate (e.g., compute, derive) one or more data encryption (DE) keys, one or more hash message authentication (HMAC) keys, and/or content-specific keys. The content-specific keys may include any one of a PIN encryption key (PK), a Password encryption key (WK), a Social Security Tax ID Key (XK), a Tokenization key (TK), a biometrics encryption key (BK), and Other to-be-defined keys (OK).

The client device 102 and/or the TLS server 104 may generate one or more object identifiers (also referred to herein as, "OID key types"). In some arrangements, the client device 102 may generate one or more object identifier (OID) key types and send (e.g., transmit, deliver) the object identifiers to the TLS server 104. In some arrangements, the TLS server 104 may generate one or more object identifiers and send (e.g., transmit, deliver) the object identifier to the client device 102. In some arrangements, the client device 102 may store one or more object identifiers in a database (not shown). In some arrangements, the TLST server 104 may store one or more object identifiers in a database (e.g., OID database 112 in FIG. 1).

Example object identifiers (OID) are as follows:

EXAMPLE OBJECT IDENTIFIERS x9-set OBJECT IDENTIIFER ::= { iso(1) identified-organization(3) tc68(133) country(16) x9(840) x9Standards(9) x9-n(n) }
iso-set OBJECT IDENTIIFER ::= { iso(1) identified-organization(3) tc68(133) standard(17) sets(n) }
set-key-type OBJECT IDENTIFIER ::= { set 2 }
set-pin-encrypt-key OBJECT IDENTIFIER ::= { set-key-type 1 }
set-password-encrypt-key OBJECT IDENTIFIER ::= { set-key-type 2 }
set-ssn-encrypt-key OBJECT IDENTIFIER ::= { set-key-type 3 }
set-token-key OBJECT IDENTIFIER ::= { set-key-type 4 }
set-kek-key OBJECT IDENTIFIER ::= { set-key-type 5 }

In some arrangements, an object identifier may be expressed as a string of numbers. For example, an object identifier may be expressed as '1.3.133.16.840.9' or '1.3.133.17'. As another example, an object identifier may be expressed as '1.3.133.16.840.9.n.2.1', where "n" is the number of a yet-to-be-written X9 standard (e.g. n=144) for X9.144.

Each SET key (e.g., content-specific keys) is uniquely identified using an object identifier. For example, the object identifier, "set-pin-encrypt-key OBJECT IDENTIFIER::= {set-key-type 1}", uniquely identifies the SET key, "pin-encrypt-key" (also referred to herein as, "PIN encryption key (PK)").

A TLS handshake protocol messaging may include a ClientHello 106 message sent from a client device 102 to a TLS server 104 to initiate the negotiation, and a ServerHello 108 message from the TLS server 104 responding back to the client device 102 to establish the session keys. The TLS message format (e.g., version 1.3, and beyond) includes an Extension field that may be used to exchange additional parameters. The ClientHello 106 message may include one or more fields, such as a Protocol Version field, Random field, an Opaque legacy session ID field, a Cipher Suites field, an Opaque legacy compression methods field, and an Extension field. The ServerHello 108 message may include one or more fields, such as a Protocol Version field, a Random field, an Opaque legacy session ID field, a Cipher Suites field, a Uint8 legacy compression methods field, and an Extension field.

The TLS server 104 may be configured to send a request to client device 102 requesting one or more secure electronic transactions (SET) data elements (also referred to herein as "sensitive data elements"). The ServerHello 108 Extensions may include one or more SET object identifiers instructing the client device 102 to derive additional SET keys (also referred to herein as, "content-specific keys") from a shared secret that the peers (e.g., client and server) previously established and pass (e.g., deliver, send, transmit) the additional SET keys to a calling application. Once the SET keys have been passed to the server and client applications, the TLS server 104 and client device 102 can then destroy their copies of the SET keys.

A client application (e.g., internet browser, etc.) executing on the client device 102 may display a command prompt and/or a pop-up window to the user that requests one or more data elements or sensitive data elements (e.g., pin, password, tax ID, etc.). In some arrangements, the client application may fetch (e.g., retrieve) the one or more data elements from a stored location (e.g., a database, a server, another client device, etc.). The client application determines a data type associated with the one or more data elements and encrypts the data element, using a SET key (also referred to herein as, "a content-specific key") corresponding to the data type, to generate a SET ciphertext (e.g., encrypted information, encoded information). For example, a user could provide an alphanumeric string, such as "password1234", via a command prompt or application (e.g., a browser). The client application could determine that "password 1234" is in the form of a password data type, and in response, the client application could encrypt the password with a SET key corresponding to a password encryption key (WK). As another example, the client application could determine that "123-45-6789" is in the form of a social security tax identifier type, and in response, the client application could encrypt the social security tax identifier with a SET key corresponding to a social security tax identifier key (XK).

The SET ciphertext (also referred to herein as, "an encrypted data element" or "data element encrypted with a content-specific key") is provided to the client device 102 for encapsulation within the encrypted TLS data packet 110 (shown in FIG. 1 as, "data packet 110") that the client device 102 transmits to the TLS server 104. In some arrangements, the client application may destroy its copies of the SET keys. The client device 102 encrypts the data packet 110 (also referred to herein as, "application data") using the TLS session keys prior to sending the data packet 110 to the TLS server 104. In some arrangements, the TLS encrypted data packet may include a Transmission Control Protocol/Internet Protocol (TCP/IP) header and/or ciphertext (e.g., an encrypted sensitive data element). Thus, if the data packet 110 includes a SET ciphertext, then encrypting the data packet 110 with the TLS session key results in the SET ciphertext (e.g., an encrypted data element of the data packet) being doubly encrypted. For example, a TLS encrypted data packet (e.g., data packet 110) with SET data elements may include a TCP/IP header and Ciphertext including SET encrypted data elements (e.g., SET ciphertext data element 1 and SET ciphertext data element 2). As another example, the data packet 110 shown in FIG. 1 includes an object identifier, a data element 'A', an encrypted data element 'B' (e.g., data element 'B' encrypted with a content-specific key), and a data element 'C'. As a result of the client device 102 encrypting the data packet 110 with the TLS session keys, the data packet 110 would include an encrypted object identifier, an encrypted data element 'A', an encrypted-encrypted data element 'B', and an encrypted data element 'C'. In some arrangements, the client device 102 encrypts one or more data elements within data packet 110 without encrypting the object identifier.

Each SET ciphertext data element is uniquely identified using a SET OD (also referred to as, "an object identifier") along with the SET ciphertext encapsulated within the normally encrypted TLS data packet (also referred to as, "a data packet 110"). The following sample code shows a SET ciphertext data element.

| EXAMPLE SET CIPHERTEXT |
| --- |
| setCiphertext ::= SEQUENCE {<br>   setCipherID   OBJECT IDENTIFER,<br>   setCipher     OCTET STRING<br>} |

The TLS server 104 decrypts the data packet 110 using the TLS session keys, and passes the cleartext blob to a receiving server application executing on the TLS server 104. The server application recognizes the SET ciphertext and decrypts it for further processing. In some arrangements, the server application may destroy its copies of the SET keys.

In some arrangements, the calling client and server applications may not send or receive encrypted sensitive data. In some arrangements, the client and server applications may perform encryption and decryption. In some arrangements, the client and server applications may manage the keys.

Figure 2B:
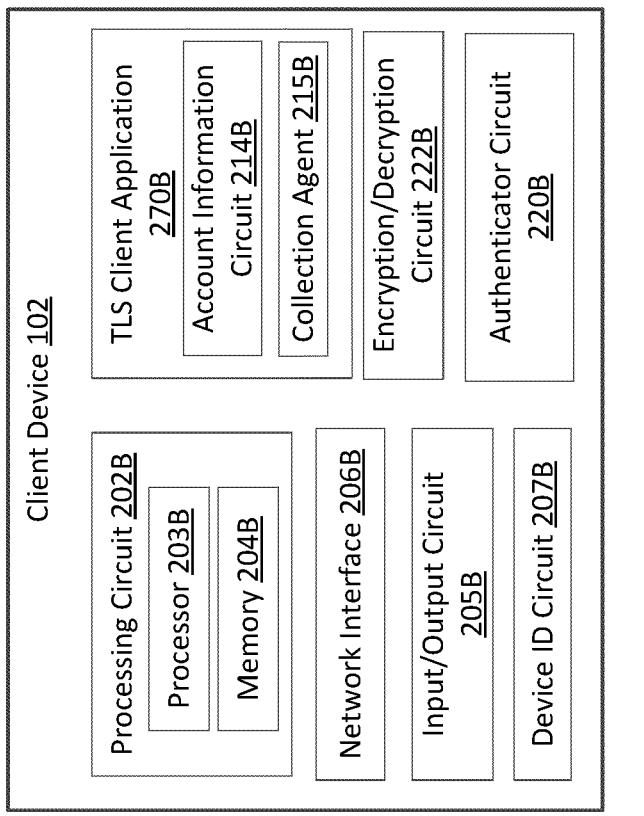
FIG. 2B is a block diagram depicting an example client device of the environment in FIG. 1, according to some arrangements.
Figure 2A:
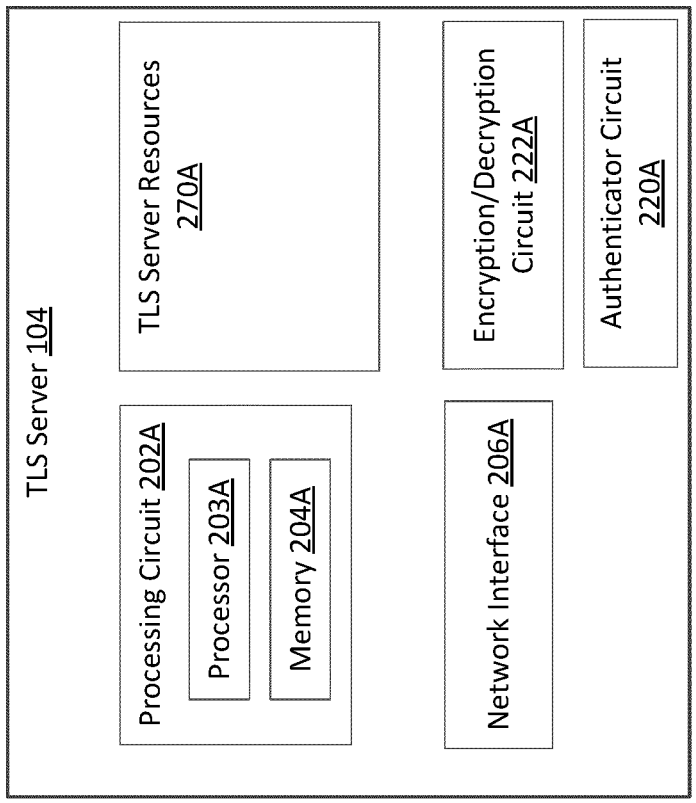
FIG. 2A is a block diagram depicting an example TLS server of the environment in FIG. 1, according to some arrangements.

FIG. 2A is a block diagram depicting an example TLS server 104 of the environment in FIG. 1, according to some arrangements. While various circuits, interfaces, and logic with particular functionality are shown, it should be understood that the TLS server 104 includes any number of circuits, interfaces, and logic for facilitating the functions described herein. For example, the activities of multiple circuits may be combined as a single circuit and implemented on a same processing circuit (e.g., processing circuit 202A), as additional circuits with additional functionality are included.

The TLS server 104 includes a processing circuit 202A composed of one or more processors 203A and a memory device 204A. A processor 203A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203A may be a multi-core processor or an array (e.g., one or more) of processors.

The memory 204A (e.g., Random Access Memory (RAM), Read-Only Memory (ROM), Non-volatile RAM (NVRAM), Flash Memory, hard disk storage, optical media, etc.) of processing circuit 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processor 203A, controls the operations of the TLS server 104. In some arrangements, the processor 203A and the memory 204A form various processing circuits described with respect to the TLS server 104. The instructions include code from any suitable computer programming language such as, but not limited to, C, C++, C#, Java, JavaScript, VBScript, Perl, HTML, XML, Python, TCL, and Basic. In some arrangements, the TLS server 104 may include an input/output circuit (not shown) for receiving/providing user input from/to a computing device (e.g., client device 102 and/or another TLS server 104). In some arrangements (referred to as "headless servers"), the TLS server 104 may omit the input/output circuit, but may communicate with a computing device (e.g., client device 102 and/or another TLS server 104) via network interface 206A.

The TLS server 104 includes a network interface 206A configured to establish a communication session with a computing device (e.g., client device 102 and/or another TLS server 104) for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In many arrangements, the TLS server 104 may include a plurality of network interfaces 206A of different types, allowing for connections to a variety of networks, such as local area networks or wide area networks including the Internet, via different sub-networks.

The TLS server 104 includes an authenticator circuit 220A that may be configured to authenticate a client device 102 to establish a shared secret and/or a connection. That is, the authenticator circuit 220A receives a request message (e.g., a ClientHello message) from a client device 102 or TLS server 104 requesting to establish a secure connection with the TLS server 104. The request message may include one or more message parameters, such as a protocol version, a client random, an opaque legacy session identifier, one or more cipher suites, opaque legacy compression methods, and/or an extension. The authenticator circuit 220A generates a ServerHello message that includes SSL certificates, its selected cipher suite, the server random, and/or any other message parameters. The authenticator circuit 220A may also include, in the ServerHello message, a server digital signature message establishing that the TLS server 104 has the private key that matches with the public key from the SSL certificate. The authenticator circuit 220A generates the server digital signature message via its private key by encrypting the client random, the server random, and a Diffie-Hellman (TLS_DH) parameter associated with the TLS server 104.

The authenticator circuit 220A may be configured to send the ServerHello message to the client device 102, causing the client device 102 to decrypt the TLS server's 104 digital signature with the public key and verifying (e.g., authenticating) that the TLS server 104 controls the private key. In response to verifying the TLS server 104, the client device 102 sends a DH parameter associated with the client device 102 to the TLS server 104. The authenticator circuit 220A generates (e.g., derives, computes, calculates) the shared secret based on the DH parameter associated with the server and/or a DH parameter associated with the client device 102.

The authenticator circuit 220A may be configured to receive from the client device 102, and in response to the client device 102 verifying the TLS server 104, the DH parameters associated with the client device 102. In response to receiving the DH parameters associated with the client device 102, the authenticator circuit 220A calculates session keys from the shared secret, client random, and server random. For example, the authenticator circuit 220A may pass the shared secret through a key derivation function (KDF) that uses a pseudorandom function to generate (e.g., compute, derive) one or more data encryption (DE) keys and/or one or more hash message authentication (HMAC) keys to facilitate confidentiality and integrity of the data.

The authenticator circuit 220A may be configured to send a ServerHello message to the client device 102 causing the client device 102 to generate a content-specific key (e.g., a first content-specific key) based on the shared secret and sending the content-specific key to the TLS server 104. In some arrangements, another content-specific key (e.g., a second content-specific key) may be the same or substantially the same as the content-specific key (e.g., a first content-specific key). In some arrangements, another content-specific key (e.g., a second content-specific key) may be different than the content-specific key (e.g., a first content-specific key).

The TLS server 104 includes an encryption/decryption circuit 222A that may be configured to receive from the client device 102, via a communication channel, a data packet. In some arrangements, the data packet may include one or more data elements, one or more encrypted data elements (e.g., a decrypted first data element, a decrypted second data element, etc.), and/or one or more object identifiers associated with the one or more of encrypted data elements. In some arrangements, a data element of a data packet may be encrypted (also referred to herein as, "an encrypted data element") with a content-specific key (e.g., a first content-specific key) that is associated with the shared secret. In some arrangements, the data packet may be encrypted with a session key. In some arrangements, a data element of the data packet may be double-encrypted. For example, a data element may initially be encrypted with a content-specific key (e.g., a first content-specific key) that is associated with the shared secret and then the data packet (and all data elements of the data packet) may be encrypted with a session key. In some arrangements, a data packet may include one or more double-encrypted data elements (e.g., a data element encrypted with a content-specific key and then encrypted with a session key) and one or more single-encrypted data elements (e.g., a data element only encrypted with a session key). In some arrangements, a data packet may include a first data element encrypted with a first content-specific key associated with the shared secret, and a second data element that is not encrypted with the first content-specific key.

The encryption/decryption circuit 222A may be configured to decrypt a data packet using the session key to recover a decrypted data packet. For example, in response to receiving a data packet, the encryption/decryption circuit 222A may retrieve the session key from a database (e.g., OID database 112, content-specific key database 114). The encryption/decryption circuit 222A may then decrypt the data packet using the session key to recover a decrypted data packet. In some arrangements, the encryption/decryption circuit 222A may store the data packet in a database. In some arrangements, the encryption/decryption circuit 222A may decrypt the data packet at a TLS tunnel termination point.

The encryption/decryption circuit 222A may be configured to generate one or more content-specific keys based on the shared secret. For example, in response to decrypting the data packet, the encryption/decryption circuit 222A may determine an existence of an object identifier in the decrypted data packet by scanning one or more portions (e.g., a header, a header field, a payload, a TCP/IP header, an extension) of the decrypted data packet for an object identifier. In some arrangements, the object identifier may exist in a TCP/IP header of a data packet. In some arrangements, the object identifier may exist in an extension or extension block of a TLS data packet. In some arrangements, the encryption/decryption circuit 222A may determine an existence of an object identifier in the decrypted data packet by comparing the scanned portions of the decrypted data packet to object identifiers stored in the OID database 112 in FIG. 1. In some arrangements, the encryption/decryption circuit 222A determines that an object identifier exists in the decrypted data if the object identifier matches, substantially matches, or is associated with an object identifier stored in the OID database 112. In some arrangements, the encryption/decryption circuit 222A determines that an object identifier exists in the decrypted data based on identifying the end of a compression method. For example, the TLS protocol allows one or more extensions to follow a compression methods field in an extensions block. Thus, the encryption/decryption circuit 222A may determine the presence of one or more extensions and/or one or more object identifiers in the one or more of the extensions by determining whether there are bytes following the compression methods at the end of the ClientHello and/or data packet, and searching the bytes for one or more object identifiers. This detection method may ensure compatibility with versions of the TLS protocol (or any other communication protocol) that do not define the use of TLS extensions.

In response to determining an existence of an object identifier in the decrypted data packet, the encryption/decryption circuit 222A may identify the data element of the decrypted data packet that is associated with (or identified by) the object identifier. For example, the encryption/decryption circuit 222A may determine that the decryptor circuit includes the object identifier, "set-pin-encrypt-key OBJECT IDENTIFIER::={set-key-type 1}" and that the object identifier uniquely identifies the content-specific key, "pin-encrypt-key". The encryption/decryption circuit 222A may then extract the data element associated with the object identifier from the decrypted data packet by scanning one or more portions (e.g., a header, a header field, a payload, a TLS extension) of the decrypted data packet for a data element associated with the "pin-encrypt-key". In some arrangements, the encryption/decryption circuit 222A copies (e.g., without extracting) the data element associated with the object identifier from the decrypted data packet. The encryption/decryption circuit 222A may determine that the object identifier identifies at least one of a pin key type, a password key type, a social security tax identifier key type, a tokenization key type, and a to-be-defined key type.

The encryption/decryption circuit 222A may generate a content-specific key (also referred to herein as, "second content-specific key") associated with the data element based on the session key and the object identifier. For example, the encryption/decryption circuit 222A may determine that the object identifier, "set-pin-encrypt-key OBJECT IDENTIFIER::={set-key-type 1}", uniquely identifies the content-specific key, "pin-encrypt-key". In response, the encryption/decryption circuit 222A generates a content-specific key in the form of a pin encryption key (referred to herein as, "PIN encryption key (PK)").

The encryption/decryption circuit 222A may decrypt the data element using the content-specific key to recover a decrypted data element. In some arrangements, the encryption/decryption circuit 222A may store the one or more content-specific keys that it generates in the content-specific key database 114 in FIG. 1. The content-specific key may be a pin encryption key, a password encryption key, a social security tax identifier key, a tokenization key, and a to-be-defined key.

The encryption/decryption circuit 222A may grant (e.g., authorize, allow, approve), via the communication channel, permission for the client device 102 to access one or more resources (depicted in FIG. 2A as "TLS Server Resources 270A") provided by the TLS server 104 based on the decrypted data element. For example, the encryption/decryption circuit 222A may determine that the object identifier, "set-pin-encrypt-key OBJECT IDENTIFIER::={set-key-type 1}", uniquely identifies the content-specific key, "pin-encrypt-key". In response, the encryption/decryption circuit 222A may compare the decrypted data element (e.g., a pin that the user of client device 102 provided) to a second pin that the encryption/decryption circuit 222A retrieves from a database. If the decrypted data element matches the second pin, then the encryption/decryption circuit 222A may grant (e.g., authorize, allow, approve) the client device 102 permission to access one or more resources provided by the TLS server 104. The TLS Server Resources 270A may include, for example, web pages, web sites, domain names, uniform resource locators, a program, an application, a document, a file, account information (e.g., banking account, brokerage account, retirement account, savings & checking account, investment account, etc.) associated with a user of the client device 102, a plurality of applications, a plurality of files, an executable program file, a desktop environment, a computing environment, a virtual computing environment, or other resource made available to a user of the client device 102 (e.g., the electronic device that sent the data packet to the encryption/decryption circuit 222A).

The encryption/decryption circuit 222A may deliver, from a TLS tunnel termination point, the content-specific key (also referred to herein as, "second content-specific key") that the encryption/decryption circuit 222A generated and the decrypted data packet to an application (e.g., TLS Server Resources 270A) executing on the TLS server 104. The encryption/decryption circuit 222A may decrypt, at the application executing on the TLS server 104, the data element of the decrypted data packet using the second content-specific key to recover the decrypted data element.

The TLS server 104 includes a bus (not shown), such as an address/data bus or other communication mechanism for communicating information, which interconnects subsystems and devices, such as the network interface 206A, the authenticator circuit 220A, and the encryption/decryption circuit 222A, or any other subsystem and device of the TLS server 104. In some arrangements, the TLS server 104 may include one or more of any such components.

In some arrangements, some or all of the circuits of the TLS server 104 may be implemented with the processing circuit 202A. For example, the network interface 206A, the authenticator circuit 220A, and the encryption/decryption circuit 222A may be implemented as a software application stored within the memory 204A and executed by the processor 203A. Accordingly, such arrangement can be implemented with minimal or no additional hardware costs. In some arrangements, any of these above-recited circuits rely on dedicated hardware specifically configured for performing operations of the circuit.

FIG. 2B is a block diagram depicting an example client device of the environment in FIG. 1, according to some arrangements. A user operates or is associated with the client device 102. While various circuits, interfaces, and logic with particular functionality are shown, it should be understood that the client device 102 includes any number of circuits, interfaces, and logic for facilitating the functions described herein. For example, the activities of multiple circuits are combined as a single circuit and implemented on a same processing circuit (e.g., processing circuit 202B), as additional circuits with additional functionality are included.

In some arrangements, the client device 102 includes a processing circuit 202B having a processor 203B and memory 204B. The processor 203B is implemented as a general-purpose processor, a microprocessor, an ASIC, one or more FPGAs, a DSP, a group of processing components that are distributed over various geographic locations or housed in a single location or device, or other suitable electronic processing components. In many arrangements, processor 203B may be a multi-core processor or an array (e.g., one or more) of processors.

The memory 204B (e.g., RAM, NVRAM, ROM, Flash Memory, hard disk storage, etc.) stores data and/or computer instructions/code for facilitating the various processes described herein. Moreover, the memory 204B is or includes tangible, non-transient volatile memory or non-volatile memory. Accordingly, the memory 204B includes database components, object code components, script components, or any other type of information structure for supporting the various activities and information structures described herein. The instructions include code from any suitable computer programming language such as, but not limited to, C, C++, C#, Java, JavaScript, VBScript, Perl, HTML, XML, Python, TCL, and Basic.

The client device 102 includes a network interface 206B configured to establish a communication session with a computing device (e.g., a TLS server 104 and/or another client device 102) for sending and receiving data over the communication network 120 to the computing device. Accordingly, the network interface 206B is an interface such as, but not limited to, the network interface 206A in FIG. 2A.

The client device 102 includes an input/output circuit 205B configured to receive user input from and provide information to a user. In this regard, the input/output circuit 205B is structured to exchange data, communications, instructions, etc. with an input/output component of the client device 102. Accordingly, input/output circuit 205B may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of client device 102, such as a built-in display, touch screen, microphone, etc., or external to the housing of client device 102, such as a monitor connected to client device 102, a speaker connected to client device 102, etc., according to various arrangements. In some arrangements, the input/output circuit 205B includes communication circuitry for facilitating the exchange of data, values, messages, and the like between the input/output device and the components of the client device 102. In some arrangements, the input/output circuit 205B includes machine-readable media for facilitating the exchange of information between the input/output device and the components of the client device 102. In still another arrangement, the input/output circuit 205B includes any combination of hardware components (e.g., a touchscreen), communication circuitry, and machine-readable media.

The client device 102 includes a device identification circuit 207B (shown in FIG. 2B as device ID circuit 207B) configured to generate and/or manage a device identifier associated with client device 102. The device identifier may include any type and form of identification used to distinguish the client device 102 from other client devices 102. In some arrangements, a device identifier may be associated with one or more other device identifiers. In some arrangements, to preserve privacy, the device identifier may be cryptographically generated, encrypted, or otherwise obfuscated by any circuit (e.g., processing circuit 202B, device identification circuit 207B, etc.) of client device 102. In some arrangements, the client device 102 may include the device identifier in a ClientHello message that the client device 102 sends to the TLS server 104 and/or another client device 102.

The client device 102 includes an authenticator circuit 220B that may be configured to authenticate a TLS server 104 or another client device 102 to establish a shared secret and/or a secure connection. That is, the authenticator circuit 220B sends a request message (e.g., a Client Hello message) to a TLS server 104 or another client device 102 requesting to establish a secure connection with the client device 102. The request message may include one or more message parameters, such as a protocol version, a client random, an opaque legacy session identifier, one or more cipher suites, opaque legacy compression methods, and/or an extension. The ClientHello may cause the TLS server 104 to generate a ServerHello message, as discussed herein, and send the ServerHello message to the client device 102.

The authenticator circuit 220B may be configured to receive and process a ServerHello message. In response to receiving the ServerHello message, the authenticator circuit 220B decrypts the TLS server's 104 digital signature from the ServerHello message using the public key and verifies (e.g., authenticates) that the TLS server 104 controls the private key. In response to verifying the TLS server 104, the authenticator circuit 220B generates and sends a DH parameter associated with the client device 102 to the TLS server 104, causing the TLS server 104 to generate a shared secret based on the DH parameter associated with the TLS server 104 and/or a DH parameter associated with the client device 102. The authenticator circuit 22B generates a shared secret based on the DH parameter associated with the TLS server 104 and/or a DH parameter associated with the client device 102. The shared secret generated by the TLS server 104 and the client device 102 may be the same, or substantially the same, shared secret.

The authenticator circuit 220B may be configured to send the DH parameters associated with the client device 102 to the TLS server 104, causing the TLS server 104 to calculate session keys from the shared secret, client random, and/or server random. The authenticator circuit 220B may be configured to generate session keys. For example, the client device 102 may pass the shared secret through a key derivation function (KDF) that uses a pseudorandom function to generate (e.g., compute, derive) one or more data encryption (DE) keys and/or one or more hash message authentication (HMAC) keys to facilitate confidentiality and integrity of the data.

The authenticator circuit 220B may be configured to generate content-specific keys. For example, the authenticator circuit 220B may receive a ServerHello message from the TLS server 104 and, in response, generate a content-specific key (e.g., a first content-specific key) based on the shared secret. In some arrangements, the client device 102 may send the content-specific key to the TLS server 104. In some arrangements, another content-specific key (e.g., a second content-specific key) may be the same or substantially the same as the content-specific key (e.g., a first content-specific key). In some arrangements, another content-specific key (e.g., a second content-specific key) may be different than the content-specific key (e.g., a first content-specific key).

The client device 102 includes an encryption/decryption circuit 222B that may be configured to encrypt one or more data elements (or portions) within application data. For example, the encryption/decryption circuit 222B may receive application data from a TLS client application (e.g., TLS client application 270B in FIG. 2B) that was provided by a user of the client device 102. The application data may include sensitive data elements (e.g., pin, password, social security number) and non-sensitive data elements. The encryption/decryption circuit 222B may determine that a data element contains sensitive data elements and, in response to this determination, encrypt the data element with a content-specific key. Otherwise, if the encryption/decryption circuit 222B determines that a data element does not contain sensitive data elements, then the encryption/decryption circuit 222B may decide to not encrypt the data element with a content-specific key. In some arrangements, the encryption/decryption circuit 222B may encrypt a first data element with a first content-specific key and a second data element with a second content-specific key. For example, the encryption/decryption circuit 222B may encrypt a first data element containing a pin with a "pin-encrypt-key" and a second data element containing a social security number with an "ssn-encrypt-key".

The encryption/decryption circuit 222B may be configured to generate a data packet to send to a TLS server 104 or another client 102 device. For example, the encryption/decryption circuit 222B may generate a data packet (e.g., data packet 110) that includes the one or more data elements within the application data. The encryption/decryption circuit 222B may include one or more object identifiers in a TCP/IP header of the data packet based whether the encryption/decryption circuit 222B encrypted any of the data elements. For example, the encryption/decryption circuit 222B may have encrypted a first data element containing a pin with a first content-specific key (e.g., "pin-encrypt-key") and a second data element containing a social security number with a second content-specific key (e.g., "ssn-encrypt-key"). In response to the encryption, the encryption/decryption circuit 222B may insert a first object identifier (e.g., set-pin-encrypt-key OBJECT IDENTIFIER::{=set-key-type 1}) into the TCP/IP header of the data packet that uniquely identifies the first content-specific key (e.g.,) and a second object identifier (set-ssn-encrypt-key OBJECT IDENTIFIER::{=set-key-type 3}) into the TCP/IP header of the data packet that uniquely identifies the second content-specific key. The encryption/decryption circuit 222B may then encrypt the data packet (including the encrypted and/or non-encrypted data elements) with a session key. In some arrangements, the encryption/decryption circuit 222B generates a data packet based on the Transport Layer Security (TLS) protocol.

In some arrangements, the encryption/decryption circuit 222B may be configured to include some or all of the functionality of the encryption/decryption circuit 222A in FIG. 2A, such that a data packet may flow from the TLS server 104 to the client device 102. For example, the encryption/decryption circuit 222B may receive from the TLS server 10, via a communication channel, a data packet. The encryption/decryption circuit 222B may decrypt the data packet using a session key to recover a decrypted data packet. The encryption/decryption circuit 222B may generate one or more content-specific keys based on the shared secret in response to determining an existence of an object identifier in the header field of the decrypted data packet. The encryption/decryption circuit 222B may generate a content-specific key associated with the data element based on the session key and the object identifier. The encryption/decryption circuit 222B may decrypt the data element using the content-specific key to recover a decrypted data element.

The client device 102 includes (or executes) a TLS client application 270B that is communicably coupled to the TLS server 104 via the communication network 120 and is configured to access one or more resources provided by the TLS server 104. In this regard, the TLS client application 270B is configured to send/receive data (e.g., data packet 110 in FIG. 1, data associated with one or more resources provided by the TLS server 104) between the client device 102 and the TLS server 104, and display within the TLS client application 270B the data that is indicative of the one or more resources, as discussed herein. The TLS client application 270B may be an internet/web browser, a graphic user interface (GUI), an email reader/client, a File Transfer Protocol (FTP) client, a virtual machine application, or a banking client application independent from an internet/web browser.

The TLS client application 270B includes a collection agent 215B. Collection agent 215B may include an application plug-in, application extension, subroutine, browser toolbar, daemon, or other executable logic for collecting data processed by TLS client application 270B and/or monitoring interactions of user with the input/output circuit 205B. In other arrangements, collection agent 215B may be a separate application, service, daemon, routine, or other executable logic separate from TLS client application 270B but configured for intercepting and/or collecting data processed by TLS client application 270B, such as a screen scraper, packet interceptor, application programming interface (API) hooking process, or other such application. The collection agent 215B is configured for intercepting or receiving data input via input/output circuit 205B, including mouse clicks, scroll wheel movements, gestures such as swipes, pinches, or touches, or any other such interactions; as well as data received and processed by TLS client application 270B. The collection agent 215B, may begin intercepting/gathering/receiving data input via its respective input/output circuit based on any triggering event, including, e.g., a power-up of client device 102 or a launch of any software application executing on a processor of client device 102.

The client device 102 includes a bus (not shown), such as an address/data bus or other communication mechanism for communicating information, which interconnects subsystems and devices, such as processing circuit 202B, processor 203B, memory 204B, network interface 206B, input/output circuit 205B, device ID circuit 207B, TLS client application 270B, encryption/decryption circuit 222B, authenticator Circuit 220B, or any other subsystem and device of the client device 102. In some arrangements, the client device 102 may include one or more of any such components.

In some arrangements, some or all of the circuits of the client device 102 may be implemented with the processing circuit 202B. For example, the subsystems and devices of client device 102 may be implemented as a software application stored within the memory 204B and executed by the processor 203B. Accordingly, such arrangement can be implemented with minimal or no additional hardware costs. In some arrangements, any of these above-recited circuits rely on dedicated hardware specifically configured for performing operations of the circuit.

Figure 3:
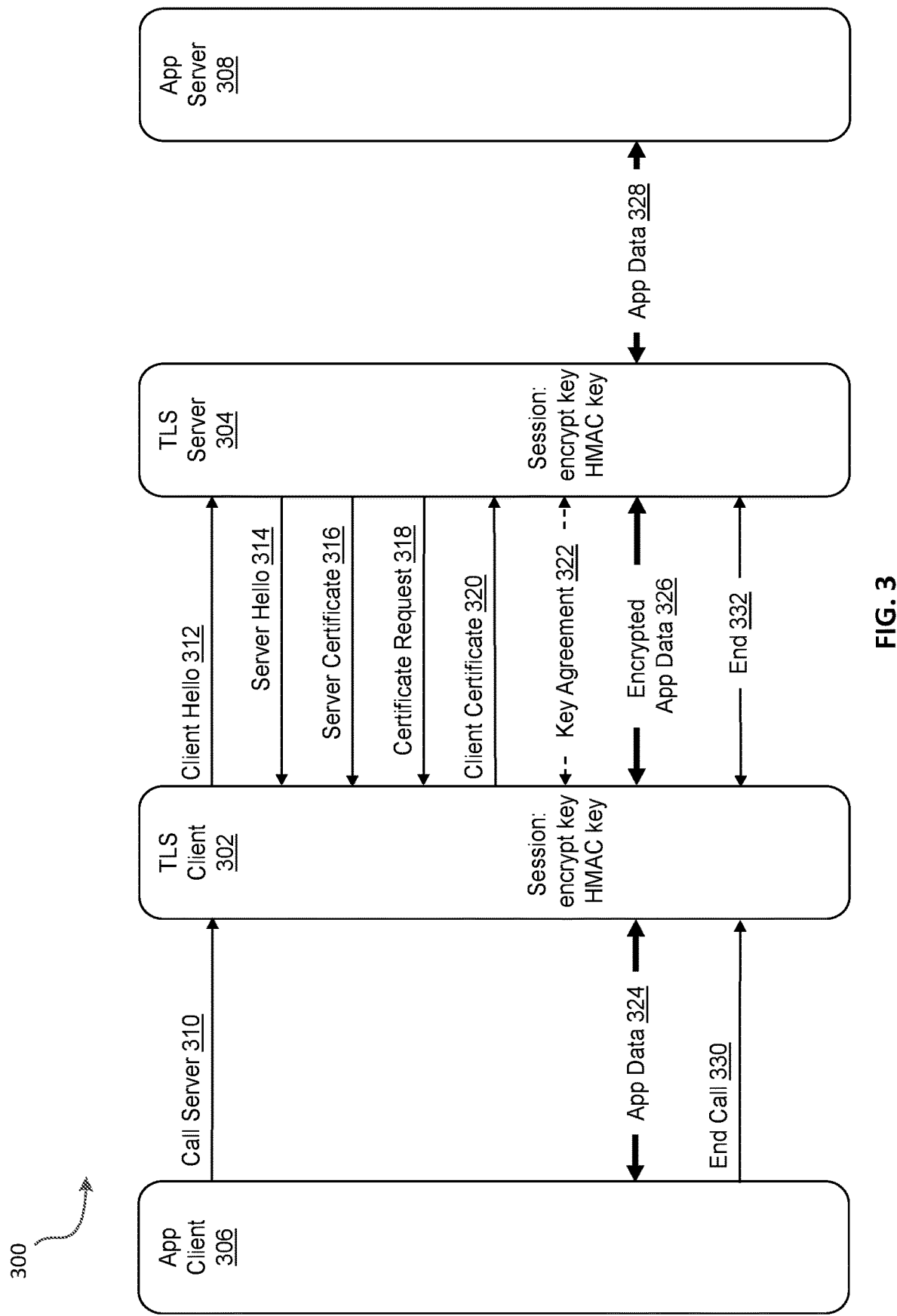
FIG. 3 is a flow diagram depicting an example environment of a transport layer security (TLS) connection without SET keys, according to some arrangements.

FIG. 3 is a flow diagram depicting an example environment of a transport layer security (TLS) connection without SET keys, according to some arrangements. The example environment 300 includes an application client (depicted in FIG. 3 as "App Client 306"), a client device (depicted in FIG. 3 as "TLS Client 302"), a server (depicted in FIG. 3 as "TLS Server 304"), and an application server (depicted in FIG. 3 as "App Server 308"). In some arrangements, the TLS Client 302 may be client device 102 in FIG. 1. In some arrangements, the App Client 306 may be TLS client application 270B in FIG. 2B. In some arrangements, the TLS Server 304 may be TLS server 104 in FIG. 1. In some arrangements, the App Server 308 may be TLS server resources 270A in FIG. 2A.

As shown in FIG. 3, the App Client 306 sends a call server 310 to the TLS Client 302 requesting a secure connection with the TLS Server 304. In response to receiving the call server 310, the TLS Client 302 generates and sends a ClientHello 312 (also referred to herein as, "a ClientHello message") to the TLS Server 304. In response, the TLS Server 304 generates and sends to the TLS Client 302 a ServerHello 314 (also referred to herein as, "a ServerHello message") that includes a server certificate 316 and/or a certificate request 318. In response, the TLS Client 302 generates and sends a client certificate 320 to the TLS server 304. The TLS client 302 and the TLS server 304 agree on a set of keys (e.g., a shared secret and/or session keys), also referred to as "a key agreement 322". The App Client 306 sends application data 324 to the TLS Client 302, causing the TLS Client 302 to encrypt the application data using the set of keys to generate encrypted application data 326. The TLS client 302 sends via a network (e.g., communication network 120 in FIG. 1) the encrypted application data 326 to the TLS server 304. Using the set of keys, the TLS Server 304 decrypts the encrypted application data 326 to generate application data 328 and sends the application data 328 to the App Server 308. The App Client 306 may send an end call 330 to the TLS Client 302. In response, the TLS Client 302 sends an end 332 to the TLS Server 304, causing the TLS Server 304 to end (e.g., terminate, halt) the secure connection. This process may be repeated in the opposite direction in instances when the App Server 308 sends application data to the App Client 306.

Figure 4A:
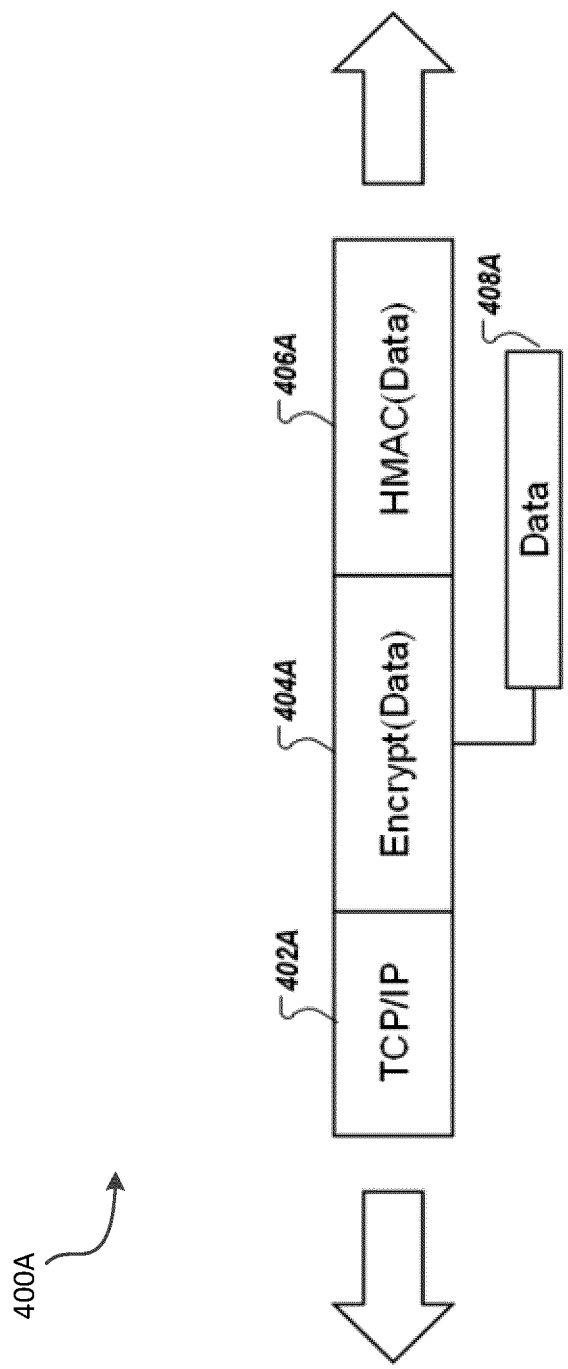
FIG. 4A is a block diagram depicting an example TLS packet without SET protected data elements, according to some arrangements.

FIG. 4A is a block diagram depicting an example TLS packet without SET protected data elements, according to some arrangements. The TLS packet 400A includes a TCP/IP header 402A, encrypted data 404A, and HMAC data 406A. The encrypted data 404A includes data 408A that is encrypted with a SET key (e.g., a content-specific key).

Figure 4B:
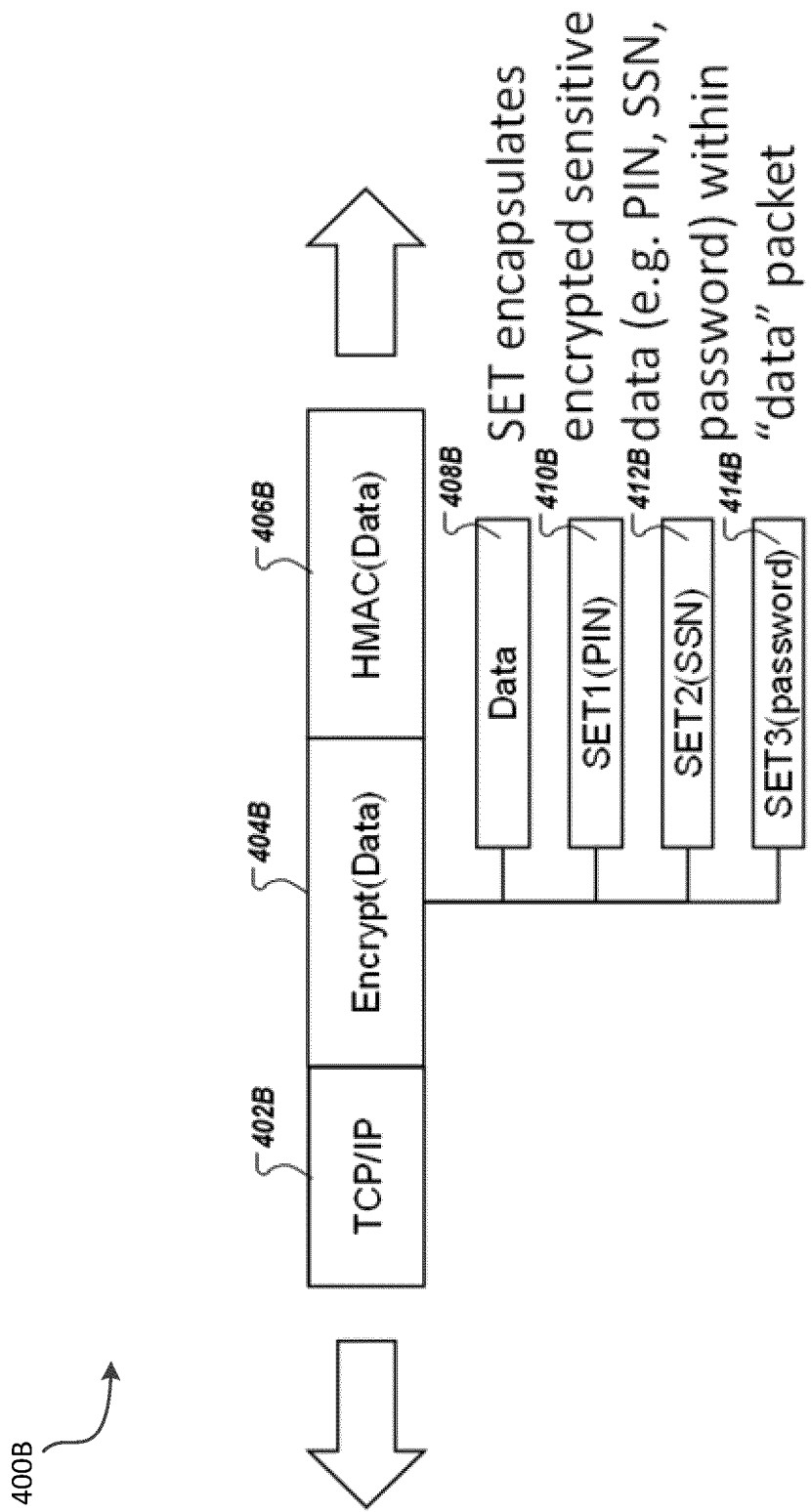
FIG. 4B is a block diagram depicting an example TLS packet with SET protected data elements, according to some arrangements.

FIG. 4B is a block diagram depicting an example TLS packet with SET protected data elements, according to some arrangements. The TLS packet 400B includes a TCP/IP header 402B, encrypted data 404B, and HMAC data 406B. The encrypted data 404B includes a non-sensitive data element (depicted in FIG. 4B as, "data 408B"). The encrypted data 404B also includes three sensitive data elements that are encrypted with a SET key. That is, the encrypted data includes SET1(PIN) 410B representing a pin encrypted with SET key 1, SET2(SSN) 412B representing a social security number encrypted with SET key 2, and SET3(password) 414B representing a password encrypted with SET key 3. In other words, the non-sensitive data element (e.g., "data") is encrypted only once, while the sensitive data elements (e.g., the pin, the SSN, and the password) are encrypted twice.

Figure 5:
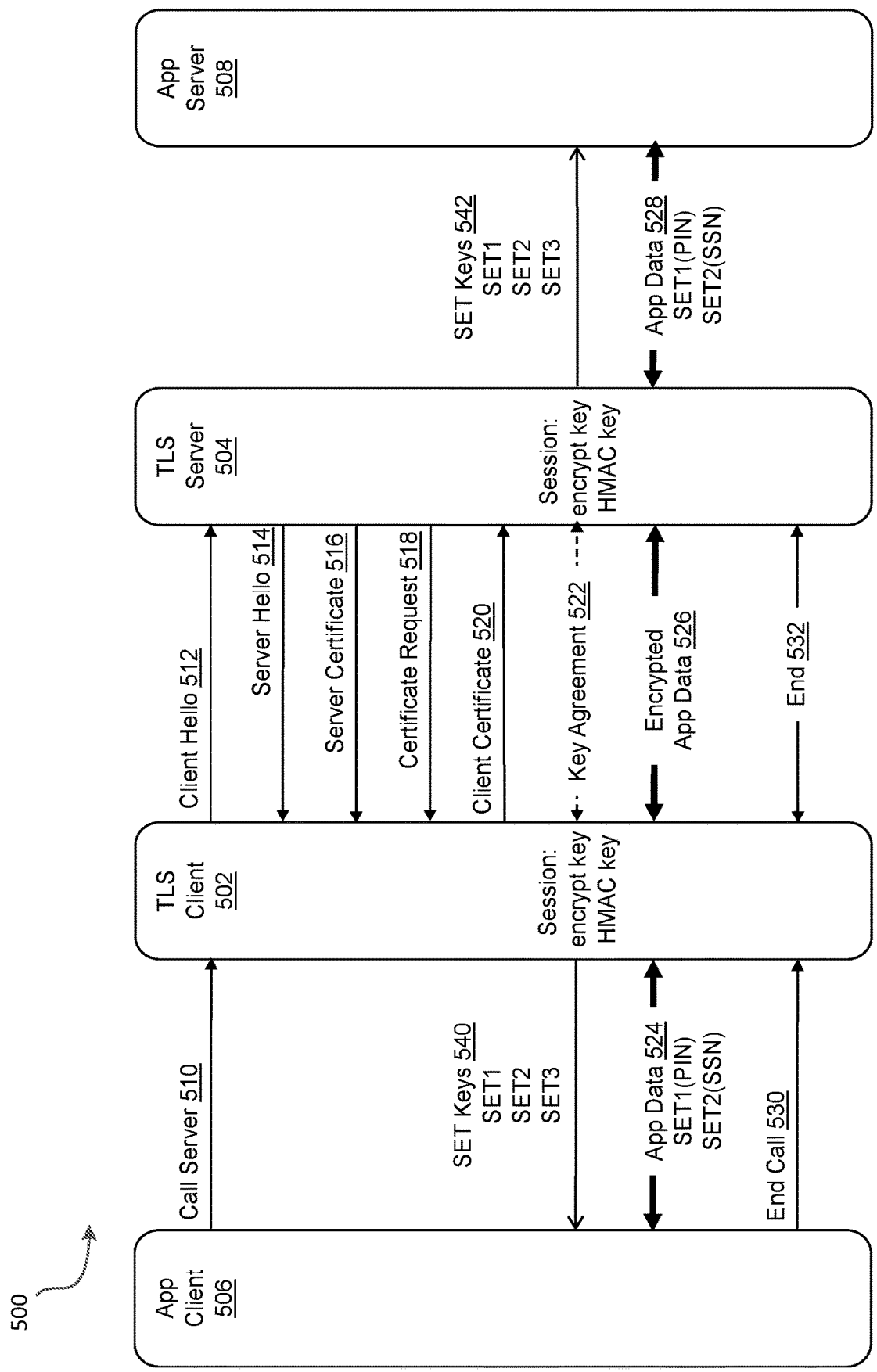
FIG. 5 is a flow diagram depicting an example environment of a TLS with SET keys, according to some arrangements.

FIG. 5 is a block diagram depicting an example environment of a transport layer security without SET keys, according to some arrangements. The example environment 500 includes an application client (depicted in FIG. 5 as "App Client 506"), a client device (depicted in FIG. 5 as "TLS Client 502"), a server (depicted in FIG. 5 as "TLS Server 504"), and an application server (depicted in FIG. 5 as "App Server 508"). In some arrangements, the TLS Client 502 may be client device 102 in FIG. 1. In some arrangements, the App Client 506 may be TLS client application 270B in FIG. 2B. In some arrangements, the TLS Server 504 may be TLS server 104 in FIG. 1. In some arrangements, the App Server 508 may be TLS Server 508 resources 270A in FIG. 2A.

As shown in FIG. 5, the App Client 506 sends a call server 510 to the TLS Client 502 requesting a secure connection with the TLS Server 504. In response to receiving the server call 510, the TLS Client 502 generates and sends a ClientHello 512 (also referred to herein as, "a ClientHello message") to the TLS Server 504. In response, the TLS Server 504 generates and sends to the TLS Client 502 a ServerHello 514 (also referred to herein as, "a ServerHello message") that includes a server certificate 516 and/or a certificate request 518. In response, the TLS Client 502 generates and sends a client certificate 520 to the TLS server 504. The TLS client 502 and the TLS server 504 agree on a set of keys (e.g., a shared secret and/or session keys), also referred to as "a key agreement 522".

Once the TLS Client 502 and the TLS Server 504 establish (e.g., agree upon) session keys, then the TLS Client 502 and the TLS Server 504 each generate SET keys (e.g., SET keys 540 and SET keys 542) that may be used to encrypt/decrypt one or more data elements within the data packet. For example, the App Client 506 sends application data 524 to the TLS Client 502 that includes a first data element (e.g., a pin) and a second data element (e.g., a social security number). The TLS Client 502 encrypts the first data element using a SET key (e.g., a pin encryption key) associated with the first data element. The TLS Client 502 encrypts the second data element using a SET key (e.g., a social security number encryption key) associated with the second data element. After encrypting the data elements with its associated encryption key, the TLS Client 502 inserts into a TLS protocol extension field of the application data 524 an object identifier (OID) for each encrypted data element that uniquely identifies the SET key used to generate the respective data element. The TLS Client 502 then encrypts the application data 524 (including all the data elements) using the set of keys to generate encrypted application data 526. The TLS client 502 sends via a network (e.g., communication network 120 in FIG. 1) the encrypted application data 526 to the TLS server 504.

Using the set of keys, the TLS Server 504 decrypts the encrypted application data to recover a decrypted application data. The TLS Server 504 scans the TLS protocol extension field for any object identifiers. In response to determining an occurrence of one or more object identifiers, the TLS Server 504 decrypts each data element using a SET key that is uniquely identified by the object identifier associated with the respective data element. That is, the TLS Server 504 decrypts the first data element using a SET key 542 (e.g., a pin encryption key) associated with the first data element. The TLS Server 504 decrypts the second data element using a SET key 542 (e.g., a social security number encryption key) associated with the second data element. The TLS Server 504 sends the decrypted application data (including each of the decrypted data elements) to the App Server 508. The App Client 506 may send an end call 530 to the TLS Client 502. In response, the TLS Client 502 sends an end 532 to the TLS Server 504, causing the TLS Server 508 to end (e.g., terminate, halt) the secure connection. This process may be repeated in the opposite direction in instances when the App Server 508 sends application data 528 to the App Client 506. In some arrangements, the TLS Client 502 may send the SET keys 540 that it generates to the App Client 506, such that the App Client 506 may encrypt one or more data elements within the application data 524 using the SET keys 540 prior to delivering the application data 524 to the TLS Client 502. In some arrangements, the TLS Server 504 may send the SET keys 542 that it generates to the App Server 508, such that the App Server 508 may decrypt the one or more data elements within the application data 528 using the SET keys 542 upon receiving the application data 528 from the TLS Server 504.

FIG. 6 is a flow diagram depicting a method for extending data protection of one or more data elements within a data packet beyond a TLS tunnel termination point by using encryption keys established when the TLS tunnel was established, according to some arrangements. Additional, fewer, or different operations may be performed in the method depending on the particular embodiment. In some arrangements, some or all operations of method 600 may be performed by one or more processors executing on one or more computing devices, data processing systems, or servers. In some arrangements, method 600 may be performed by one or more secure transaction servers, such as one or more TLS servers 104 in FIG. 1. In some arrangements, some or all operations of method 600 may be performed by one or more client devices, such as one or more client devices 102 in FIG. 1. Each operation may be re-ordered, added, removed, or repeated.

As shown in FIG. 6, the method 600 includes operation 602 of authenticating, by one or more processors via a communication channel, a client to establish a shared secret. The method also includes the operation of 604 of receiving, by the one or more processors from the client via the communication channel, a data packet comprising a data element and an object identifier associated with the data element, the data element encrypted with a first content-specific key associated with the shared secret, the data packet encrypted with a session key. The method also includes the operation of 606 of decrypting, by the one or more processors, the data packet using the session key to recover a decrypted data packet. The method also includes the operation of 608 of determining, by the one or more processors, an existence of an object identifier in the decrypted data packet. The method also includes the operation of 610 of decrypting, by the one or more processors, the data element of the decrypted data packet using a second content-specific key associated with the object identifier to recover a decrypted data element.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
   authenticating, by one or more processors via a communication channel, a client device to establish a shared secret;
   receiving, by the one or more processors from the client device via the communication channel, a data packet comprising a data element and an object identifier associated with the data element, the data element encrypted with a first content-specific key associated with the shared secret, the data packet encrypted with a session key;
   decrypting, by the one or more processors, the data packet using the session key to recover a decrypted data packet;
   determining, by the one or more processors, an existence of an object identifier in the decrypted data packet; and
   decrypting, by the one or more processors, the data element of the decrypted data packet using a second content-specific key associated with the object identifier to recover a decrypted data element.

2. The method of claim 1, wherein authenticating the client device comprises,
   sending, by the one or more processors, a message to the client device causing the client device to generate the first content-specific key based on the shared secret and sending the first content-specific key to the one or more processors; wherein the second content-specific key is the first content-specific key.

3. The method of claim 1, wherein authenticating the client device comprises,
   generating, by the one or more processors, the second content-specific key based on the shared secret.

4. The method of claim 1, wherein the data packet further comprising a second data element that is not encrypted with the first content-specific key.

5. The method of claim 1, wherein decrypting the data element comprises:
   extracting, by the one or more processors, the object identifier from the decrypted data packet;
   generating, by the one or more processors, a content-specific key associated with the data element based on the session key and the object identifier extracted from the decrypted data packet; and
   decrypting, by the one or more processors, the data element using the content-specific key to recover the decrypted data element.

6. The method of claim 1, further comprising:
   authorizing, by the one or more processors via the communication channel, permission for the client device to access one or more resources provided by the one or more processors based on the decrypted data element.

7. The method of claim 1, wherein the content-specific keys comprises at least one of a pin encryption key, a password encryption key, a social security tax identifier key, a tokenization key, and a to-be-defined key.

8. The method of claim 1, wherein the object identifier identifies at least one of a pin key type, a password key type, a social security tax identifier key type, a tokenization key type, and a to-be-defined key type.

9. The method of claim 1, wherein the object identifier exists in a Transport Layer Security (TLS) extension.

10. The method of claim 1, wherein the data packet further comprising a decrypted second data element.

11. The method of claim 1, wherein the one or more processors decrypts the data packet at a Transport Layer Security (TLS) tunnel termination point.

12. The method of claim 11, wherein decrypting the data element of the decrypted data packet comprising:
    delivering, by the one or more processors from the Transport Layer Security (TLS) tunnel termination point, the second content-specific key and the decrypted data packet to an application executing on the one or more processors; and
    decrypting, by the one or more processors at the application, the data element of the decrypted data packet using the second content-specific key to recover the decrypted data element.

13. A system comprising:
    one or more processors; and one or more computer-readable storage mediums storing instructions which, when executed by the one or more processors, cause the one or more processors to:
    authenticate, via a communication channel, a client device to establish a shared secret;
    receive, via the communication channel, a data packet comprising a data element and an object identifier associated with the data element, the data element encrypted with a first content-specific key associated with the shared secret, the data packet encrypted with a session key;
    decrypt the data packet using the session key to recover a decrypted data packet;
    determine an existence of an object identifier in the decrypted data packet; and
    decrypt the data element of the decrypted data packet using a second content-specific key associated with the object identifier to recover a decrypted data element.

14. The system of claim 13, wherein the one or more computer-readable storage mediums store instructions that cause the one or more processors to further:
    send a message to the client device causing the client device to generate the first content-specific key based on the shared secret and sending the first content-specific key to the one or more processors; wherein the second content-specific key is the first content-specific key.

15. The system of claim 13, wherein the one or more computer-readable storage mediums store instructions that cause the one or more processors to further:
    generate the second content-specific key based on the shared secret.

16. The system of claim 13, wherein the data packet further comprising a second data element that is not encrypted with the first content-specific key.

17. The system of claim 13, wherein the one or more computer-readable storage mediums store instructions that cause the one or more processors to further:
    extract the object identifier from the decrypted data packet;
    generate a content-specific key associated with the data element based on the session key and the object identifier extracted from the decrypted data packet; and
    decrypt the data element using the content-specific key to recover the decrypted data element.

18. The system of claim 13, wherein the one or more computer-readable storage mediums store instructions that cause the one or more processors to further:
    authorizing, via the communication channel, permission for the client device to access one or more resources provided by the one or more processors based on the decrypted data element.

19. The system of claim 13, wherein the content-specific keys comprises at least one of a pin encryption key, a password encryption key, a social security tax identifier key, a tokenization key, and a to-be-defined key.

20. The system of claim 13, wherein the object identifier identifies at least one of a pin key type, a password key type, a social security tax identifier key type, a tokenization key type, and a to-be-defined key type.

21. The system of claim 13, wherein the object identifier exists in a Transport Layer Security (TLS) extension.

22. The system of claim 13, wherein the data packet further comprising a decrypted second data element.

23. The system of claim 13, wherein the one or more processors decrypt the data packet at a Transport Layer Security (TLS) tunnel termination point.

24. The system of claim 23, wherein the one or more computer-readable storage mediums store instructions that cause the one or more processors to further:
   deliver, from the Transport Layer Security (TLS) tunnel termination point, the second content-specific key and the decrypted data packet to an application executing on the one or more processors; and
   decrypt, at the application, the data element of the decrypted data packet using the second content-specific key to recover the decrypted data element.

25. A non-transitory computer-readable storage medium storing instructions which, when executed by one or more processors, cause the one or more processors to perform operations comprising:
   authenticating, by one or more processors via a communication channel, a client device to establish a shared secret;
   receiving, by the one or more processors from the client device via the communication channel, a data packet comprising a data element and an object identifier associated with the data element, the data element encrypted with a first content-specific key associated with the shared secret, the data packet encrypted with a session key;
   decrypting, by the one or more processors, the data packet using the session key to recover a decrypted data packet;
   determining, by the one or more processors, an existence of an object identifier in the decrypted data packet; and
   decrypting, by the one or more processors, the data element of the decrypted data packet using a second content-specific key associated with the object identifier to recover a decrypted data element.

* * * * *